(12) United States Patent
O'Brien et al.

(10) Patent No.: US 8,104,505 B2
(45) Date of Patent: Jan. 31, 2012

(54) TWO-WAY ACTUATOR AND METHOD

(75) Inventors: Robert S. O'Brien, Katy, TX (US);
Robert T. O'Brien, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 433 days.

(21) Appl. No.: 12/470,565

(22) Filed: May 22, 2009

(65) Prior Publication Data
US 2010/0294376 A1 Nov. 25, 2010

(51) Int. Cl.
*F16K 21/04* (2006.01)

(52) U.S. Cl. ............... 137/527; 137/624.27; 166/332.8; 175/231; 175/318

(58) Field of Classification Search ............... 137/534, 137/527.4, 448, 527; 166/332.8, 332.1, 54; 175/231, 318; 251/11, 12
See application file for complete search history.

(56) References Cited

U.S. PATENT DOCUMENTS

| | | | | |
|---|---|---|---|---|
| 1,721,746 A * | 7/1929 | Pearson | ............ | 137/448 |
| 1,790,541 A * | 1/1931 | Hagey et al. | ............ | 137/448 |
| 2,162,578 A * | 6/1939 | Hacker | ............ | 175/318 |
| 2,713,870 A * | 7/1955 | Baker | ............ | 166/320 |
| 2,921,601 A * | 1/1960 | Fisher, Jr. | ............ | 175/318 |
| 2,931,439 A * | 4/1960 | Alexander | ............ | 166/320 |
| 4,067,358 A * | 1/1978 | Streich | ............ | 251/230 |
| 4,825,902 A * | 5/1989 | Helms | ............ | 137/527 |
| 6,196,261 B1 * | 3/2001 | Dennistoun | ............ | 137/527 |
| 6,712,145 B2 * | 3/2004 | Allamon | ............ | 166/332.8 |
| 6,920,930 B2 * | 7/2005 | Allamon et al. | ............ | 166/332.8 |
| 7,287,596 B2 * | 10/2007 | Frazier et al. | ............ | 166/332.8 |
| 7,357,181 B2 * | 4/2008 | Webb et al. | ............ | 166/332.8 |
| 7,360,600 B2 * | 4/2008 | MacDougall et al. | ..... | 166/332.8 |
| 7,533,729 B2 * | 5/2009 | Rogers et al. | ............ | 166/332.8 |
| 2004/0108109 A1 * | 6/2004 | Allamon et al. | ............ | 166/243 |
| 2007/0062700 A1 * | 3/2007 | Webb et al. | ............ | 166/325 |
| 2010/0212907 A1 * | 8/2010 | Frazier | ............ | 166/332.8 |
| 2011/0088908 A1 * | 4/2011 | Xu | ............ | 166/332.8 |

OTHER PUBLICATIONS

Pedigo, John et al., An Acoustical Controlled Down-Hole Safety Valve, 1976,Society of Petroleum Engineers.*
Surbey, D.W. et al., Study of Subcritical Flow Through Multiple-Orifice Valves, Feb. 1988, SPE Production Engineering.*
Bolding, Jeff L. et al., Damaged Control Line Replacement Safety Valve System: Thru Tubing, Mar. 31, 2009, Society of Petroleum Engineers.*
Pierce, Phillip E. et al.,Flow Closing Coefficients from Water Flow Tests for Subsurface Controlled Safety Valves, Sep. 28, 1975, Society of Petroleum Engineers.*

* cited by examiner

*Primary Examiner* — Craig Schneider
*Assistant Examiner* — Craig J Price
(74) *Attorney, Agent, or Firm* — Cantor Colburn LLP

(57) ABSTRACT

Disclosed herein is a two-way actuator. The actuator includes, a tubular, movably positionable within a structure between at least a first position and a second position, the tubular having a first density selected such that buoyancy forces urge the tubular toward the first position in response to submersion of the tubular within a fluid having a second density that is greater than the first density, and at least one flow resistor disposed at the tubular configured to urge the tubular toward the second position in response to fluid flow interacting with the at least one flow resistor.

18 Claims, 1 Drawing Sheet

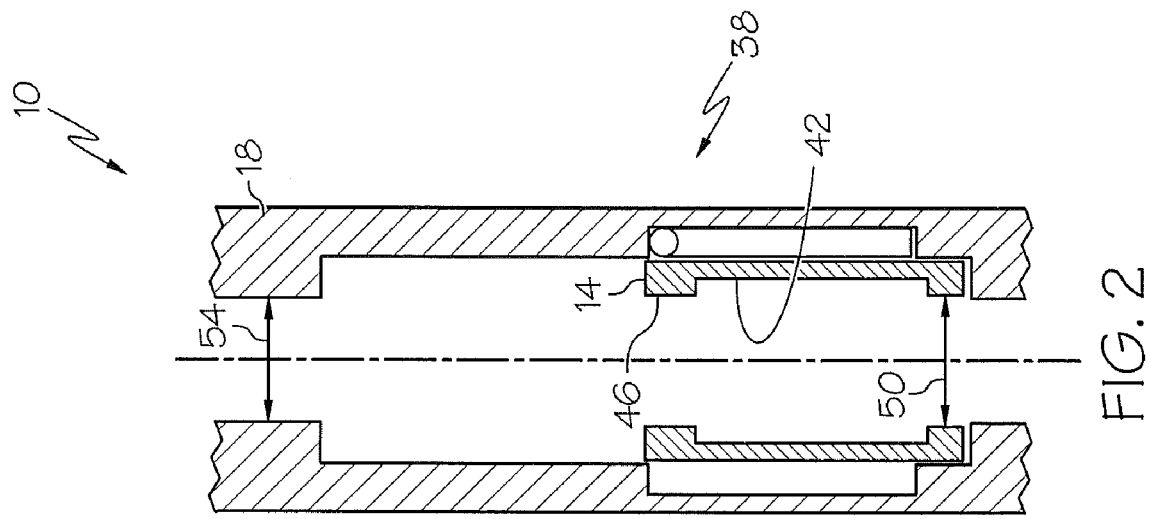
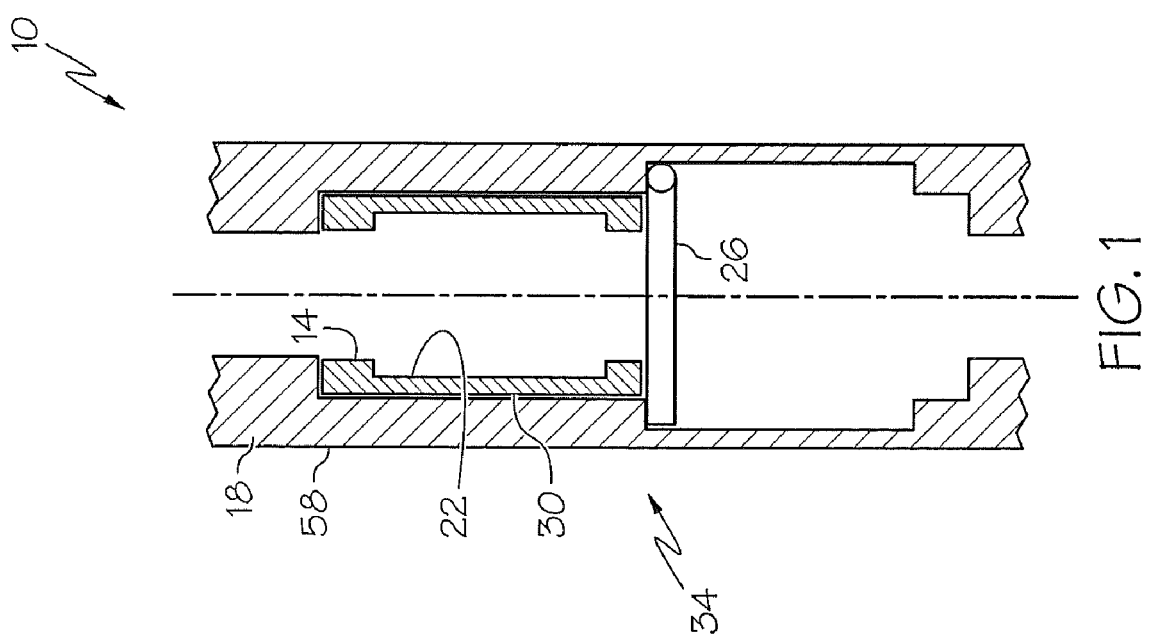

TWO-WAY ACTUATOR AND METHOD

BACKGROUND

Downhole system operators are always receptive to new methods and devices to permit actuation of tools located downhole within a downhole system. Increasing flow rates of fluid pumped from surface can and has been harnessed as a method to permit actuation of a number of different types of devices in the downhole environment. In such methods downhole actuators typically use power springs to bias the actuator against the actuation forces and to return the actuator to an original position when flow has ceased. While these work well for their intended purpose, contamination can inhibit actuation of the power spring thereby preventing actuation. Devices and methods that permit actuation based on flow while not incurring the drawback noted would be well received in the art.

BRIEF DESCRIPTION

Disclosed herein is a two-way actuator. The actuator includes, a tubular, movably positionable within a structure between at least a first position and a second position, the tubular having a first density selected such that buoyancy forces urge the tubular toward the first position in response to submersion of the tubular within a fluid having a second density that is greater than the first density, and at least one flow resistor disposed at the tubular configured to urge the tubular toward the second position in response to fluid flow interacting with the at least one flow resistor.

Further disclosed herein is a method of actuating in two directions. The method includes, flowing fluid through a tubular, moving the tubular in a first direction in response to resisting the flowing fluid with the tubular, reducing a rate of fluid flow, and moving the tubular in a second direction with buoyancy forces acting on the tubular from fluid surrounding the tubular.

BRIEF DESCRIPTION OF THE DRAWINGS

The following descriptions should not be considered limiting in any way. With reference to the accompanying drawings, like elements are numbered alike:

FIG. 1 depicts a cross sectional view of a two-way actuator disclosed herein illustrated in a first position; and FIG. 2 depicts a cross sectional view of the two-way actuator of FIG. 1 illustrated in a second position.

DETAILED DESCRIPTION

A detailed description of one or more embodiments of the disclosed apparatus and method are presented herein by way of exemplification and not limitation with reference to the Figures.

Referring to FIGS. 1 and 2, an embodiment of a two-way actuator 10 is illustrated generally at 10. The actuator 10 is a two-way actuator that has no power spring to return the actuator to a starting position as is commonly employed in downhole subsurface safety valves, for example. As such, the actuator 10 is not susceptible to spring contamination that can jam the spring and thereby prevent actuation. Yet the actuator 10 provides a mechanism and method for actuating a downhole tool in two directions in response to fluid flow. Although embodiments depicted herein are in reference to downhole applications, it should be noted that the two-way actuators described herein are not limited to downhole applications, and as such can be used in any application needing a two-way actuator.

The actuator 10 includes, a tubular 14, movably positionable within a structure 18 that is configured to allow fluid flow therethrough. The tubular 14 itself can have a flow resistor 22 that increases an urging force on the tubular 14 that is proportional to the flow of fluid there past, such as fluid injected from surface in a downhole application, for example. (Note, however, that since the tubular 14 itself generates an urging force proportional to fluid flow therethrough the tubular 14 itself can be the flow resistor 22.) The tubular 14 has an overall density, defined as the mass of the tubular 14 divided by the volume of the tubular 14 that is less than a density of a fluid into which the tubular 14 is expected to be submerged. Overall density is described herein because some portions of the tubular 14 may be denser while other portions may be less dense while the overall density is constant and is the parameter that determines the overall buoyancy of the tubular 14. A resulting buoyancy force from the fluid acting on the tubular 14 urges the tubular 14 in a direction of the buoyancy forces. The tubular 14 can therefore be actuated in a first direction against the buoyancy force in response to fluid flowing therethrough and then back, in a second direction that is opposite to the first direction, by the buoyancy forces in response to a selected reduction or cessation in the flow of fluid.

This two-way movement of the tubular 14 can be used to, bidirectionally, actuate a tool 26. A biasing member (not shown) biases the tool 26, depicted in this embodiment as a flapper, toward an end 30 of the tubular 14, depicted in this embodiment as a flow tube. As such, when the tubular 14 is in a first position 34 (shown in this embodiment in FIG. 1 as an upward position) the flapper 26 sealingly engages the end 30 (or separate seat component, not shown, attached thereto), thereby preventing upward flow of fluid through the tubular 14. Fluid flow through the tubular 14 causes the flapper 26 to pivot away from the end 30 thereby causing it to open. Fluid flow alone may not fully open the flapper 26, in such case; movement of the tubular 14 to a second position 38 (shown in this embodiment in FIG. 2 as a downward position) causes the flapper 26 to pivot away from the end 30 to a fully open position thereby allow fluid flow through the tubular 14 in either direction. With the foregoing, the flapper 26 is actuated from a closed to an open position in response to initiation and flowing of fluid through the tubular 14, and conversely, the flapper 26 is allowed to actuate from the open to the closed position in response to a decrease in fluid flow that permits buoyancy forces to move the tubular 14 from the second position 38 to the first position 34. Alternate embodiments could include an attachment between the tubular 14 and the flapper 26 or another tool (not shown), such that upward movement of the tubular 14 mechanically moves the flapper 26 or another tool (not shown), to the closed position.

Since the upward movement of the tubular 14 is due only to the buoyancy forces, it may be desirable to increase the buoyancy forces by minimizing the overall density of the tubular 14. Making the tubular 14 a hollow structure is one way to minimize the overall density thereof. A tubular 14 made of two or more pieces that are attached to one another thereby defining an empty cavity therebetween, is one way of fabricating a low density tubular 14. The two or more pieces can sealedly attached by one of welding, brazing, press fitting and adhesive attachment for example. Alternately, the tubular 14 can be made of a material including a foaming agent that forms a multitude of small cavities therewithin to minimize the overall density of the tubular 14 to provide adequate buoyancy forces in target fluids. The tubular 14 can be made of a variety of materials including, metal, polymer and ceramic, for example. In a case wherein the tubular 14 is made with the foaming agent, a skin can be formed at the surface to provide an external seal, or shell, or erosion protection for the flapper while also providing a smooth surface for interfacing with movable seals, such as the flapper 26, for example.

Whatever amount of buoyancy forces are generated, the flow resistor 22 needs to generate enough urging force on the tubular 14 to overcome them. The flow resistor 22 can, therefore, include any detail on the tubular 14 designed to create such urging forces, including no detail at all. In this embodiment, the flow resistor 22 consists of an annular recess 42 formed in a radially inwardly facing surface 46 of the tubular 14. Fluid flowing through the tubular 14 interacts with the recess 42 creating turbulence in the fluid and an urging force on the tubular 14. One advantage of using the recess 42 as the flow resistor 22 is that it allows a smallest inner dimension 50 of the tubular 14 to be equal to or greater than a smallest inner dimension 54 of a drillstring 58, for example, in areas beyond the tubular 14. Such a configuration allows full bore access through the actuator 10, such as during an intervention operation, while the actuator 10 remains in place. Alternate embodiments could use a plurality of the recesses 42 to generate greater urging forces in response to fluid flow.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A two-way actuator, comprising:
   a tubular, movably positionable within a structure between at least a first position and a second position, the tubular having a first density selected such that buoyancy forces urge the tubular toward the first position in response to submersion of the tubular within a fluid having a second density that is greater than the first density; and
   at least one flow resistor disposed at the tubular configured to urge the tubular toward the second position in response to fluid flow interacting with the at least one flow resistor.

2. The two-way actuator of claim 1, wherein the tubular is returnable to the first position in response to the buoyancy forces acting thereon when fluid flow is reduced below a selected value.

3. The two-way actuator of claim 1, further comprising a flapper sealable to the tubular when the tubular is in the first position.

4. The two-way actuator of claim 1, wherein the tubular is a flow tube of a safety valve.

5. The two-way actuator of claim 1, wherein the tubular has a through bore having a minimum bore dimension that is no less than a minimum bore dimension of the structure.

6. The two-way actuator of claim 1, wherein at least a portion of the tubular is hollow.

7. The two-way actuator of claim 1, wherein the tubular is made of a foamed material.

8. The two-way actuator of claim 1, wherein the at least one flow resistor includes at least one annular recess formed in a radially inwardly facing surface of the tubular.

9. The two-way actuator of claim 1, wherein the tubular is one of the group consisting of metal, polymer and ceramic.

10. A method of actuating in two directions, comprising:
    flowing fluid through a tubular;
    moving the tubular in a first direction in response to resisting the flowing fluid with the tubular;
    reducing a rate of fluid flow; and
    moving the tubular in a second direction with buoyancy forces acting on the tubular from fluid surrounding the tubular.

11. The method of actuating in two directions of claim 10, wherein the first direction is opposite to the second direction.

12. The method of actuating in two directions of claim 10, wherein the first direction is substantially downward and the second direction is substantially upward.

13. The method of actuating in two directions of claim 10, further comprising selecting a density of the tubular that is less than a density of a targeted fluid.

14. The method of actuating in two directions of claim 10, further comprising opening a flapper with the moving of the tubular in the first direction.

15. The method of actuating in two directions of claim 10, further comprising closing a flapper against the tubular with the moving of the tubular in the second direction.

16. The method of actuating in two directions of claim 10, wherein the reducing the rate of fluid flow includes ceasing fluid flow.

17. The method of actuating in two directions of claim 10, wherein the flowing fluid is injection fluid from a surface.

18. The method of actuating in two directions of claim 10, wherein the moving the tubular in the first direction actuates a tool in operable communication therewith and the moving the tubular in the second direction actuates a tool in operable communication therewith.

* * * * *